H. V. & A. A. DUNHAM.
MANUFACTURE OF DRY MILK POWDER.
APPLICATION FILED JULY 2, 1907.
997,976.
Patented July 18, 1911.
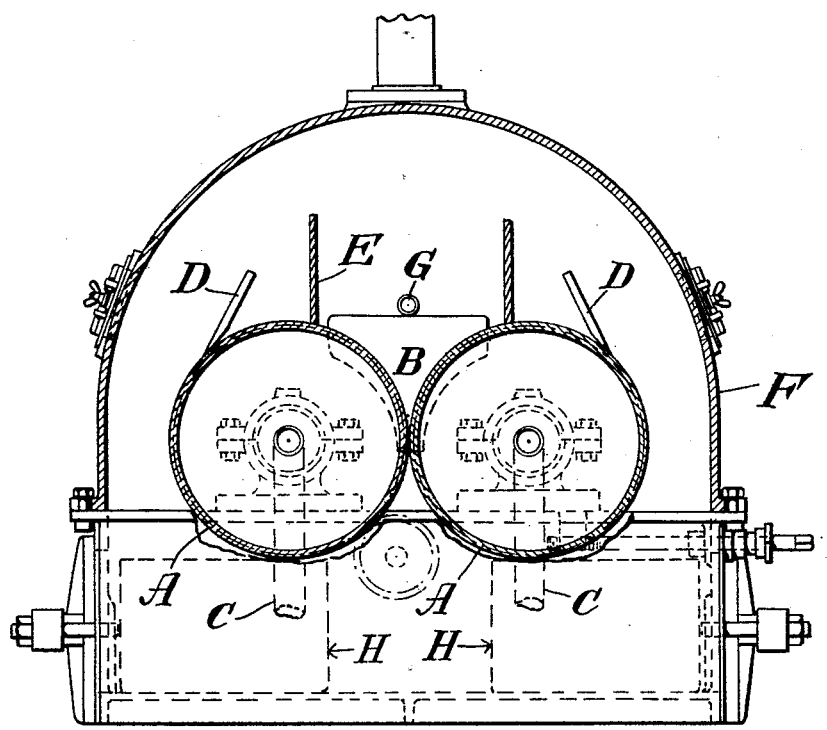
Attest:
Henry V. Dunham
Andrew A. Dunham, Inventors
by _____ Attys.

UNITED STATES PATENT OFFICE.

HENRY V. DUNHAM AND ANDREW A. DUNHAM, OF BAINBRIDGE, NEW YORK, ASSIGNORS TO CASEIN COMPANY OF AMERICA, OF NEW YORK, N. Y., A CORPORATION OF NEW JERSEY.

MANUFACTURE OF DRY MILK-POWDER.

997,976.     Specification of Letters Patent.     Patented July 18, 1911.

Application filed July 2, 1907. Serial No. 381,908.

*To all whom it may concern:*

Be it known that we, HENRY V. DUNHAM and ANDREW A. DUNHAM, citizens of the United States of America, residing both at Bainbridge, in the county of Chenango, State of New York, have invented certain new and useful Improvements in the Manufacture of Dry Milk-Powder, of which the following is a full disclosure.

The invention is a process of eliminating the water from whole or skimmed milk to produce a dry milk powder which may be subsequently reunited with water to reproduce the original and natural fluid, and the invention consists in the discovery we have made that by drying the milk *in vacuo* under certain conditions of temperature, as hereinafter specified, a product of dry milk can be obtained which is substantially the unchanged solid contents of the original milk, having no flavor of boiled or cooked milk and which is readily soluble in water.

We are aware that considerable investigation has already been made of this subject, to the end of obtaining the results just stated, and we are particularly familiar with the process of Dr. John A. Just as disclosed in his Patent No. 712,545, dated November 4, 1902, and under which the corporate assignee of our present invention is now making dry milk as exclusive licensee. The present invention is to be distinguished from such process by the degree of temperature at which the milk is preliminarily boiled, due to the employment of the vacuum, and by the quality and solubility of the product, as will be hereinafter fully explained.

According to the Just process the fluid milk to be converted into powder is boiled violently at 212 degrees F. and immediately drawn out as a thin film on the surface of a hot cylinder where it dries, and the dried film is scraped off the cylinder in the form of powder. The violent boiling of the fluid milk at 212° F. immediately precedent to the drying is described as the essential step in carrying out the Just process, as otherwise the product is found to be insoluble in water. The said product, however, has an objectionable flavor of boiled milk which is present in spite of the fact that the boiling is carried on only for a very brief space of time. We are also aware that numerous attempts have been made to improve upon the flavor of the product obtained from the Just process, by drying the milk on heated cylinders and otherwise within a vacuum chamber, keeping the temperature of the milk and of the thin film at all times below 212° F. in order to prevent its cooking or acquiring the cooked or boiled flavor, and we have ourselves conducted extensive experiments on these lines.

The present invention is distinguished from the previous vacuum processes in that the temperature of the milk is kept below its atmospheric boiling point, only during the preliminary partial condensation, and is subsequently drawn off in a thin film upon the moving surface of a cylinder or other drier, which surface is heated considerably above the atmospheric boiling point, where it is rapidly dried.

In the practice of the new process we employ a machine which is illustrated in section in the accompanying drawings. The two hollow cylinders A A appropriately geared so as to rotate together in opposite directions, are closely juxtaposed, though not in actual contact, so as to form a substantially closed trough between them, each end of the trough being closed by a close-fitting end-plate B. The steam pipes C, shown in dotted lines, enter the hubs of the cylinders for heating them from the inside. Each cylinder is supplied with a doctor D, and the trough between the cylinders is provided with a deflector E on either side, for confining the foaming milk to the trough so that it will not spill over on the sides of the cylinders. In the drawings the supports for the doctors are omitted for clearness. The foregoing apparatus, with the exception of the deflector, is substantially the same as employed by Dr. Just, but for the practice of this invention, the same is inclosed in a casing F forming a vacuum chamber through which the milk-supply pipe G passes to deliver the liquid milk into the above mentioned trough.

With the parts arranged as above described and as shown in the drawing, the cylinders are rotated so that their proximate faces descend. Having created a vacuum of about 24–26 inches within the chamber F, we admit saturated steam at about 20 to 30 lbs. pressure into the cylinders, so that their temperature is between 258° and 273° F., *i. e.* considerably above the atmospheric boiling point of the milk, and then introduce a small quantity of the liquid milk through pipe G, into the trough between the cylinders while they are rotated as above described. The violent ebullition of the milk as it comes into contact with the heated cylinders takes place at a temperature below the atmospheric boiling point according to the degree of rarefaction in the vacuum chamber, and the temperature of the boiling mass does not exceed that temperature, although the cylinders are more highly heated as above stated. The violent ebullition constitutes a rapid partial condensation of the milk. The rotation of the cylinders causes a thin film to be drawn off upon the surface of them, and upon leaving the bottom of the mass of milk, the film is subjected to a rise of temperature ultimately reaching, or nearly reaching, the temperature of the surface of the steam-heated cylinders before it is removed by the doctors in the ordinary manner. This rise of temperature and intense heating of the film endures for the time that the cylinder rotates about five-eighths of a revolution, which equals approximately six seconds, and, contrary to perhaps the natural expectation, such heating does not give a cooked flavor to the dried milk. The film as removed by the doctors falls in white or yellowish white, thin, fluffy and flaky masses into the receiver pans, shown in dotted lines at H, from which it may be removed in any desired manner. The conditions of steam pressure and speed of cylinders as above specified, we have found to give the most efficient results in the production of our product on a commercial scale, but it is to be understood that these factors are capable of some variation one way or the other without appreciably altering the quality of the product. As a general rule the speed of the cylinders should be just a little faster than is observed to caramelize the milk sugar in the film of milk, which fact is appreciable from the darkened or brownish color of the product as distinguished from the pale white or yellow color of the uncaramelized powder. A material increase of the steam pressure above that above stated thus requires a corresponding acceleration of the cylinders, but the steam pressure must always supply heat of 212° F. or more to the cylinders, and we prefer a pressure of about 25 pounds with the cylinders rotating at seven revolutions per minute. The degree of rarefaction should be as high as can be conveniently maintained at the altitude of the locality where the process is conducted, in order that the rise of temperature of the film, i. e. from that of the boiling mass in the trough to that of the exposed surface of the cylinder, shall be as great as possible, and for the same reason we prefer to use a temperature as high as compatible with the practical running speed of the apparatus.

The dry milk product we have produced by the above process is soluble or emulsifiable in cold water without grinding or any further treatment, as soon as it leaves the doctors. It has a fresh wholesome odor and lasts indefinitely without impairment, under proper conditions. When recombined with water, the reliquefied milk preserves its sweetness appreciably longer than the corresponding product obtained according to Dr. Just's process, and when it sours, it does so uniformly and naturally throughout, whereas the Just reliquefied milk separates into a watery fluid at the bottom and the solids at the top, when it sours. Our product is further to be distinguished from the Just product by the fact that its solubility is not affected, when made from milk taken from freshened cows, or during a period of about two months in the spring of the year at about the time when the cows first go to grass, it being well recognized that during this period the Just process is utterly inoperative for producing a soluble product. Pot cheese and koomiss may also be made from our product, which is not possible with the Just process. As in the case of Dr. Just's process, however, we consider it advisable, before drying the milk according to this invention, to make sure that it is only slightly acid, and in the case of milk that is considerably acid, to add a compensating amount of alkali, this being for the purpose of producing a sweet and neutral powder.

It will be understood that the process of this invention is not confined for its performance to the special machine herein described and shown in the drawing, but that other apparatus having moving drying surfaces upon which the milk is deposited in the form of a thin film *in vacuo* and by which the said film may be subjected to the considerable rise of temperature as above specified, will be equally efficient.

The improved qualities of our dry milk product depend on the preliminary, partial condensation of the milk in mass, and *in vacuo*, followed by the very considerable rise of its temperature while in the form of a thin and finely attenuated film and still in the vacuum, the duration of such rise being as above described.

Having described our invention, what we claim and desire to secure by United States Letters Patent is:

1. The herein-described process of drying milk to solid form, consisting in partially condensing the milk by boiling it *in vacuo* at a temperature which is considerably below 212° F., the natural boiling point at atmospheric pressure, then completing the drying operation by exposing the partially condensed milk, in a thin film, to the action of a moving surface heated to a temperature considerably above 212° F.

2. The herein described process of drying milk to solid form, consisting in partially condensing the milk by boiling it *in vacuo* at a temperature which is considerably below 212° F. and in contact with a rotating cylinder having a surface heated to a temperature considerably above 212° F., and then completing the drying operation by exposing said partially condensed milk in a thin film to said highly heated surface for a period of approximately six seconds.

In testimony whereof, we have signed our names to the specification in the presence of two subscribing witnesses.

HENRY V. DUNHAM.
A. A. DUNHAM.

Witnesses:
O. L. CRUMB,
W. J. ROIDER.

Copies of this patent may be obtained for five cents each, by addressing the "Commissioner of Patents, Washington, D. C."